United States Patent
Dorcely

(10) Patent No.: US 6,287,125 B1
(45) Date of Patent: Sep. 11, 2001

(54) DISTRIBUTED INTERACTIVE PRESENTATION AND RESPONSE SYSTEM WITH TRANSLATION FEATURE

(76) Inventor: Jacques A. Dorcely, 1233 E. 83rd St., Brooklyn, NY (US) 11236

( * ) Notice: Subject to any disclaimer, the term of this patent is extended or adjusted under 35 U.S.C. 154(b) by 0 days.

(21) Appl. No.: 09/134,715

(22) Filed: Aug. 14, 1998

(51) Int. Cl.⁷ .................. G09B 7/02; G09B 7/07
(52) U.S. Cl. .............. 434/323; 434/350; 434/323; 434/157
(58) Field of Search .................. 434/350, 362, 434/118, 169, 322, 323, 157; 348/1, 13, 14, 15; 455/2, 6.3; 704/8, 270, 277

(56) References Cited

U.S. PATENT DOCUMENTS

| | | | | |
|---|---|---|---|---|
| 4,715,818 | * | 12/1987 | Shapiro et al. | 434/118 X |
| 5,251,130 | * | 10/1993 | Andrews et al. | 704/5 |
| 5,412,712 | * | 5/1995 | Jennings | 379/88 X |
| 5,480,306 | * | 1/1996 | Liu | 434/156 X |
| 5,810,599 | * | 9/1998 | Bishop | 434/157 X |
| 5,823,788 | * | 10/1998 | Lemelson et al. | 434/350 X |
| 5,882,202 | * | 3/1999 | Sameth et al. | 434/157 X |
| 6,077,085 | * | 6/2000 | Parry et al. | 434/322 X |
| 6,092,036 | * | 7/2000 | Hammann | 704/8 X |

* cited by examiner

Primary Examiner—Michael O'Neill
Assistant Examiner—Chanda Harris
(74) Attorney, Agent, or Firm—Goldstein & Canino

(57) ABSTRACT

A system architecture, and associated methods of operation, are disclosed to support the interactive presentation, examination, and discussion of problem and discussion statements. The system includes a presenter computer operated by a presenter or an instructor, and a plurality of audience computers that are operated by audience members, such as students. The presenter computer and audience computers are linked by a suitable communication network to support the exchange of information between the computers, as required to support the interactive presentation. A large screen display unit is additionally included to enable information to be presented to the entire audience, when necessary. The system further provides for the translation of the information exchanged between the presenter and audience computers into as many languages as is required by composition of the audience.

8 Claims, 7 Drawing Sheets

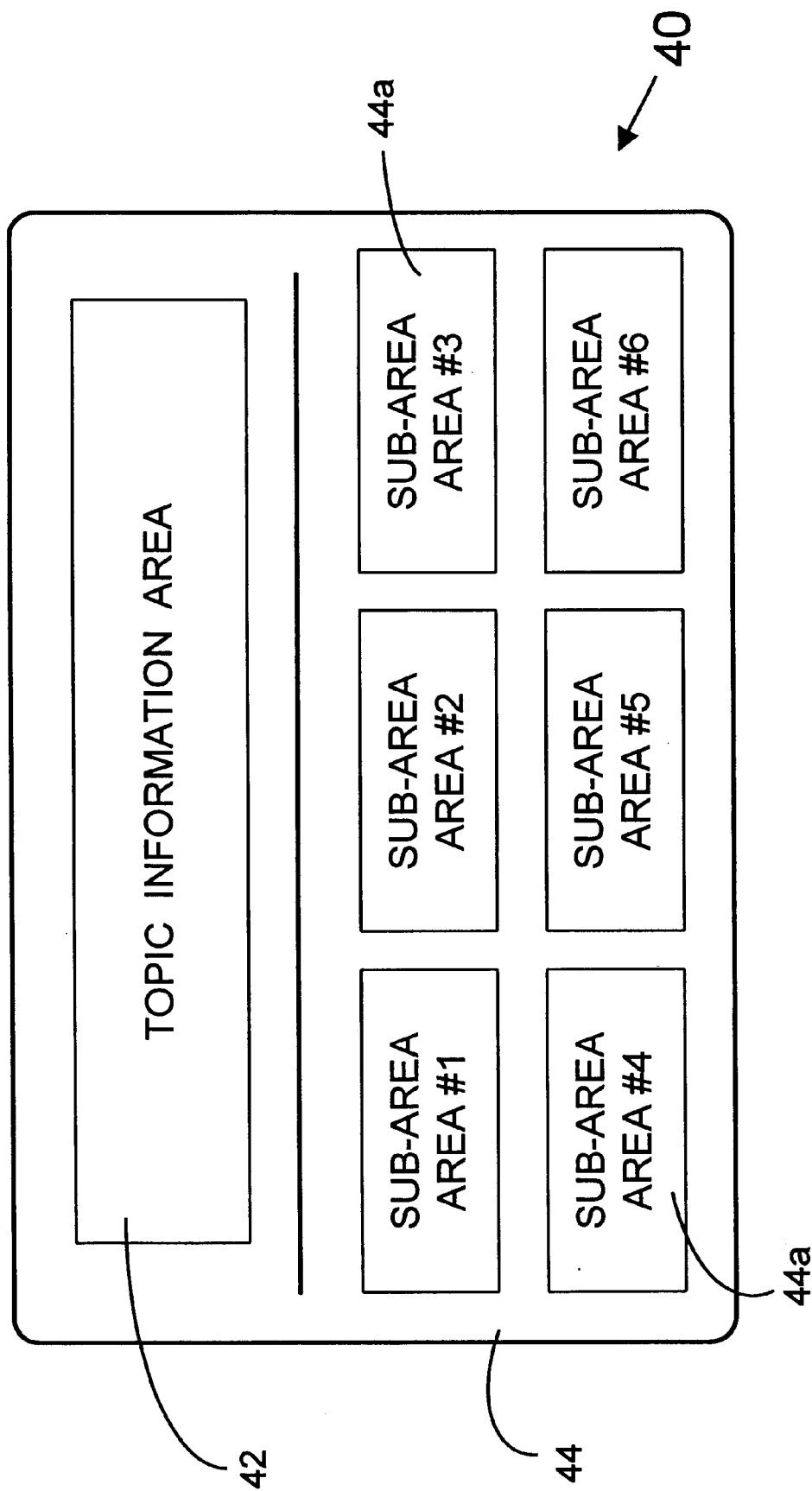

DISTRIBUTED INTERACTIVE PRESENTATION AND RESPONSE SYSTEM WITH TRANSLATION FEATURE

BACKGROUND OF THE INVENTION

1. Field Of The Invention

The present invention relates interactive presentation and educational systems. More particularly, the invention relates to a distributed computer based system, and associated methods of operation, to enable the teaching and or presentation of a subject matter topic to an audience that may be located in one or more locations.

2. Background And Objects Of The Invention

Personal computers have been employed in educational settings for a number of years to support somewhat interactive learning. Early programs would typically operate on 'stand-alone' computers, wherein subject matter was presented to one or more users. Questions would then be delivered to the users, and (very often) a response would involve the selection of one of a plurality of listed/suggested choices. Thus, the equivalent of an electronic or computer based multiple choice arrangement would be employed to present information. These programs suffered from several significant limitations. First, if the user or student required additional information, or alternately a clarification of the information provided, such an interactive capability was lacking. Second, when employing standalone computer arrangements, a statistical summary of student performance was not immediate and easy to ascertain. Skilled persons will recognize other difficulties with such limited arrangements.

As the cost of personal computing and advanced networking continued to decline, educational and presentation systems that were once unaffordable or impractical to deploy, could be realized, constructed, and supported, with relatively small budgets. Initially networked arrangements of computers were organized in what were termed "computer labs". The associated programs were delivered from centralized servers, reducing the effort required to load and upgrade software on the individual computers in the lab. As time passed, the level of interactively improved, especially with programs associated with mathematical or 'memorization' based subjects, such as biology and history. There is still however, a certain lack of interaction that is possible with such arrangements, especially when employed in class room settings.

There is presently available technology that will enable traditional lecture material to be integrated into a computer based classroom (or presentation environment), wherein the instructor or presenter can present information to an entire class or audience. Further, such systems need to enable oral or computer delivered responses (possibly private and somewhat discreet in nature) and related information to exchange between an instructor and an audience.

Therefore, when considering prior art educational and presentation system architectures, there is a need to provide new and improved arrangements with associated methods of operation, which support the presentation of subject matter in an interactive and somewhat personalized, private fashion. Objects of the present invention are, therefore, to provide new and improved presentation system architectures, and methods of operation therefore, to support the interactive presentation of subject matter to an audience of individuals having one or more of the following capabilities, features, characteristics, and or advantages:

- an architecture employing a networked, distributed plurality of computers;
- includes a presenter computer and preferably a plurality of audience computers;
- may include one or more large display units that are observable by audience members;
- significantly improves the interaction between one or more audience members and the presenter;
- enables information to be delivered to the entire audience or specific audience members employing respective audience computers;
- supports individual interaction between the presenter and audience members or an interaction where the presenter may provide information and or responses to an entire audience;
- a scalable architecture;
- enables easy management and presentation of selected subject or discussion matter information; and
- simple relatively low cost architecture employing embodiments based on many off-the shelf hardware components.

The above listed objects, advantages, and associated novel features of the present invention, as well as others, will become more apparent with a careful review of the description and figures provided herein. Attention is called to the fact, however, that the drawings and the associated description are illustrative and exemplary only, and variations are certainly possible.

SUMMARY OF THE INVENTION

In accordance with the present invention a system architecture, and associated methods of operation, are provided to support the interactive presentation of subject matter by a presenter to a plurality of audience members. The system includes a presenter computer, which is operable by the presenter, and (preferably) a plurality of audience computers. Each respective audience computer, which is operated by at least one audience member, enables the associated audience member(s) to provide information to the presenter. The information would typically be input to the audience computer being used by associated audience members and be transferred to the presenter computer for consideration by the presenter. The audience computers further enable the discreet delivery of information from the presenter to the associated audience members utilizing said computers. A large display unit may be included that is configured to receive information from the presenter computer, wherein the information received is displayed and viewable by the audience members. It is contemplated that the large display unit should be capable of receiving and displaying text and or graphical information to assist in the interactive presentation of the subject matter.

The system further includes a communication network to enable information to be exchanged between the presenter computer and all included audience computers. Accordingly the communication network enables the exchange of information between the presenter computer and the respective audience computers in a cyclical manner. The cyclical flow of information is essential to provide for the interactive presentation and discussion of the subject matter to be considered.

Several methods are provided to interactively present subject matter, including problem statements or discussion statements, to audience members. The subject matter is presented by employing a presenter computer operated by a presenter to generate a statement indicating the problem or discussion topic. The presenter computer may be operatively coupled to a large display unit to receive information therefrom for displaying and viewing by the entire group of audience members. Alternately, the problem or discussion statement may be delivered to audience members via the audience computers over the communication network. If required, translation may be provided at the presenter computer, the audience computers, or both. In addition, translation to and from a plurality of languages can be supported by the present invention.

Once a topic statement is received by the respective audience computers, a temporal period for analysis is provided. The methods of the present invention permit additional information to be requested by audience members, on an 'as needed' basis. This additional information is contemplated to be requested in a somewhat private and discreet manner, via the communication network, by the audience members (or groups thereof) associated with respective audience computers. The requests from the audience members are preferably provided to the presenter by way of a presenter display, that is most preferably partitioned into a plurality of sub-areas or regions. Each of the plurality of the sub-areas is associated with (in a one-to-one fashion) each client computer and the information provided to, or received therefrom. A complete discussion of several most preferred methods for the system operation will be fully discussed below.

BRIEF DESCRIPTION OF THE DRAWINGS

In the drawings, like elements are assigned like reference numerals. It is important to note that each of the embodiments of the invention depicted are but one of a number of possible arrangements utilizing the fundamental concepts of the present invention. The drawings are briefly described as follows:

FIG. 3 depicts a display of a presenter computer partitioned into a plurality of viewing areas.

LIST OF REFERENCE NUMERALS USED IN THE DRAWINGS

10—presentation arrangement or architecture
12—presenter computer
16—large display unit
18—sound unit
20—audience computers
22—processor module
22*a*—processor
22*b*—memory or memory unit
22*c*—interface (circuitry)
24—user interface
24*a*—display unit
24*b*—manual input device (keyboard and pointing device)
24*c*—audio output unit
24*d*—voice synthesis and recognition unit
28—network interface circuit (nic)
40—presenter display
42—first (viewing) area or region of presenter display
44—second (viewing) area or region of presenter display
44*a*—sub-area of second area or region
48—communication network
50 to 130—flowchart blocks

DETAILED DESCRIPTION OF THE PREFERRED EMBODIMENTS

It is important to establish the definition of a number of terms and expressions that are used throughout this disclosure. The term 'presenter' may be assumed to be any person (or possibly a very small group of individuals), including a teacher, professor, marketing person, sales person, doctor, engineer, lawyer, etc., that is presenting a problem or discussion statement to a plurality of audience members. Accordingly, "audience members" may be assumed to include students, colleagues, professionals, politicians, etc. As such the terms presenter and audience member are intended to be utilized in a broad, non-limiting fashion, and are certainly intended to indicate that the present invention may be employed in a variety of environments including schools and universities, as well as commercial and professional settings. The expressions "problem statement" and "discussion statement" are terms used to indicate a topic, or type of topic, that will to establish or define subject matter to be considered, analyzed, and discussed—preferably causing information to be cyclically exchanged between the presenter and the audience members. For example, a problem statement may range from a classic mathematical word problem to a (philosophical type) logic problem. In contrast, a discussion problem may be rooted in a topic related to politics or religion. Accordingly, a discussion statement differs from a problem statement in that one or more specific answers are not necessarily being sought through the interactive presentation and consideration of a discussion problem. As such, a discussion problem may be interactively presented to simply consider a topic for general review, analysis, and or debate. Additional terms and their associated meanings will be provided as needed.

Figure 1:
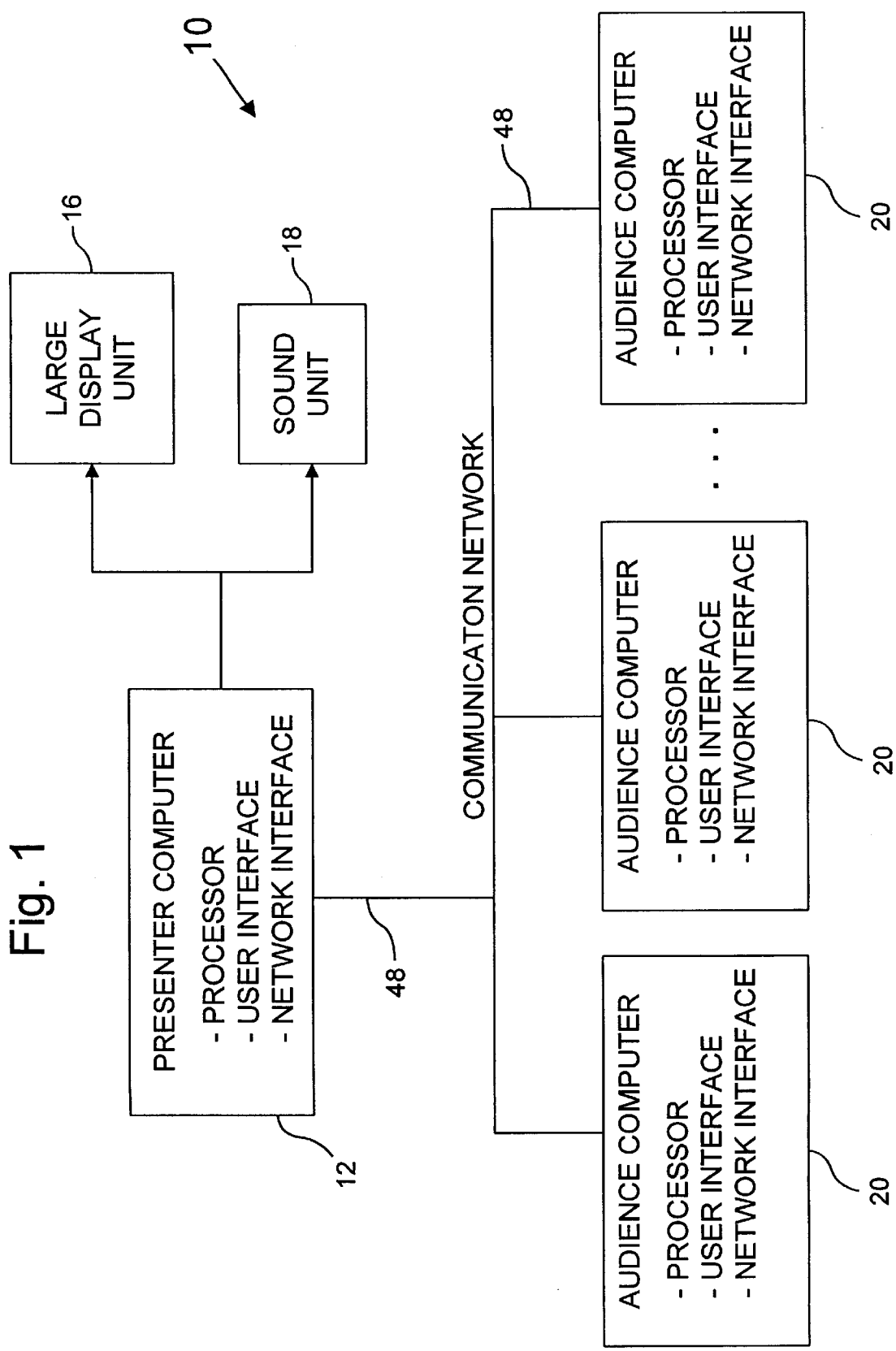
FIG. 1 provides a high-level block diagram of an embodiment of the present invention employing presenter and audience computers.

Referring now to FIG. 1, there is provided a high-level block diagram of a system to enable the interactive presentation of subject matter by a presenter to a plurality of audience members. As can be seen in FIG. 1, the system includes a presenter computer 12 that is operable by the presenter, preferably via a manual input device including one of a keyboard or a pointing device such as a mouse. A large display unit 16 is configured to receive information from the presenter computer 12. The information received and displayed by the large display unit 16 is viewable by all the audience members. It should be noted that if the system 10 is employed to present information (such as problem statements and discussion statements) to a large audience, possibly located in more than one room, more than one of the large display unit 16 may be required and included with the present invention. Each large display unit 16 would preferably be capable of receiving and displaying text and graphical information to assist in the interactive presentation of the subject matter being discussed or learned. In addition, each included large display unit 16 may be operably coupled to the presenter computer 12 by either a communication network 48 (to be discussed further below) or a direct coupling to the presenter computer 12 that is independent of the communication network 48 (as illustrated in FIG. 1).

The system 10 further includes at least one audience computer 20 that is operable by at least one audience member. Each audience computer 20 is configured to enable at least one associated audience member to provide information to the presenter by way of the presenter computer. Further, the system 10 supports the delivery of information from the presenter computer 12 to the associated audience members using a respective audience computer 20. A suitable communication network 48 is employed to enable information to be exchanged between the presenter computer 12 and included audience computers 20. It should be noted that the system is arranged to present information to, and receive responses from, audience members to enable a cyclical flow of information between the presenter and the audience members to support the interactive presentation of the subject matter to be learned and or discussed.

To support the delivery of audio information to the audience members, especially when the audience is large or located in distinct locations/rooms, the system 10 may include a sound unit 18. The sound unit 18 is arranged to receive audio information from the presenter via the presenter computer 12 and deliver the audio information to all of the audience members involved with the interactive presentation. The audio information delivered by the sound unit 18 may include recorded music, sounds acting as prompts (for example) to draw the attention of the audience), prerecorded messages, and the like. As skilled persons would appreciate, it may be preferable to provide the sound unit 18 as an integral part of the large display units 16.

Figure 2:
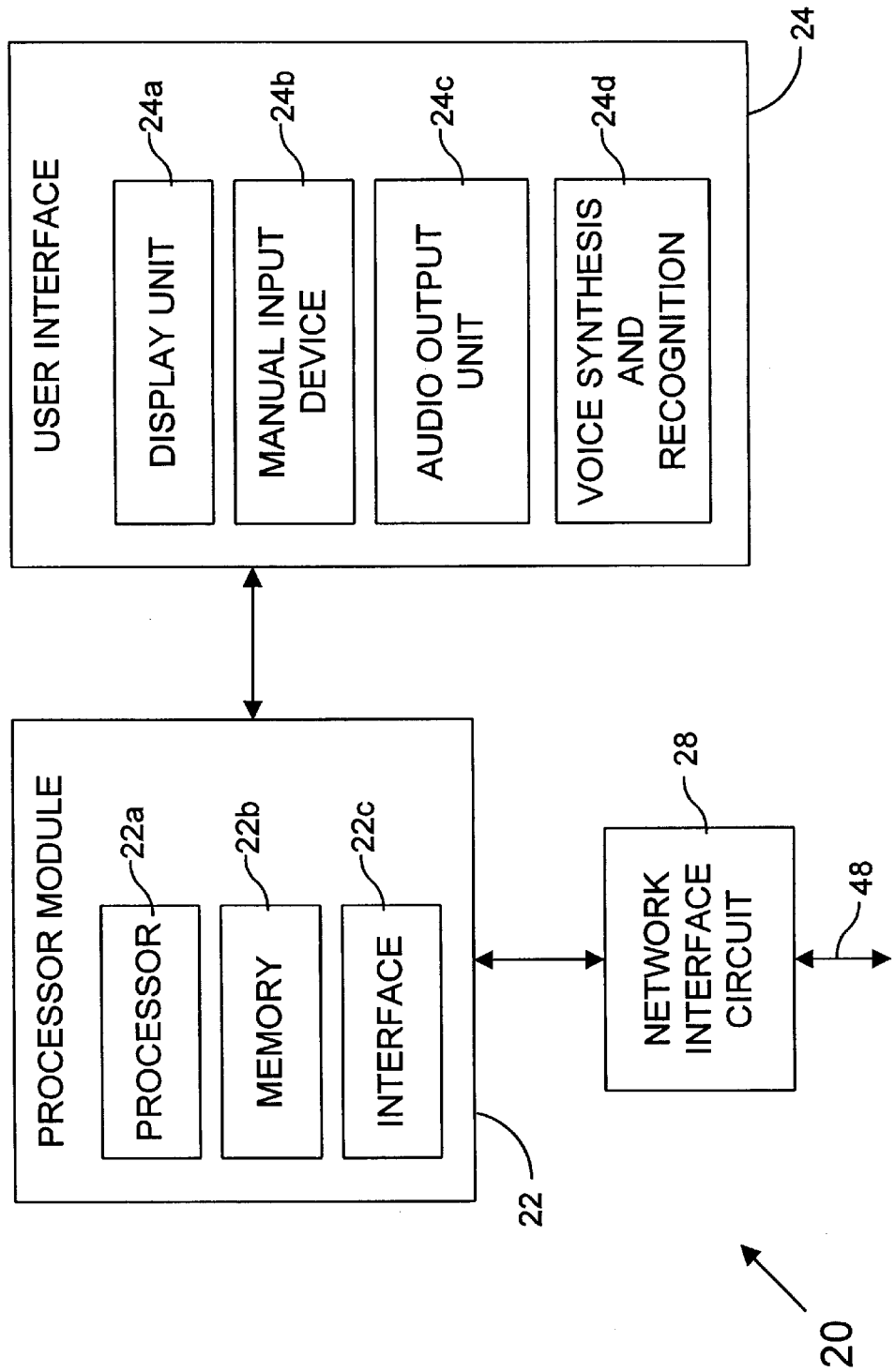
FIG. 2 provides a more detailed block diagram of an embodiment of an audience computer (and possibly a presenter computer also).

As can be seen in FIG. 2, the audience computer 20 may be embodied with several main portions including a processor module 22, a user interface 24 and a network interface circuit (nic) 28. The processor module 22 includes a processor 22a, a memory 22b, and required interface (circuitry) 22c, which are all well known to skilled persons. The user interface 24 may include a display unit 24a that is viewable by audience members using the respective audience computer 20, and a manual input device 24b including at least one of a keyboard or a pointing device such as a mouse. Each audience computer 20 may further include an audio output unit 24c and a voice synthesis and recognition unit 24d. The audio output unit 24c, may provide a function that is similar to the sound unit 18 to enable audio information to be delivered to the entire audience, or alternately may provide unique audio information to each respective audience computer 20. The voice synthesis and recognition unit 24d, if included, enables sound waves produced by the audience members at respective audience computers 20 to be converted to information that may be delivered to the presenter computer 12 (preferably as text based information), and further enables information provided by the presenter via the presenter computer 12 to be audibly delivered to the audience members (using respective audience computers 20). As is required with virtually all distributed and networked computer arrangements, the audience computer 20, as well as the presenter computer 12, will normally employ a network interface circuit (nic) 28 to support the exchange of information between the plurality of computer and peripheral sub-systems within the system 10. As skilled persons will appreciate, the communication network 48 may be hardwired, wireless, cellular, or any combination thereof.

It should be noted that the architecture of the presenter computer 12 and the audience computer 20 need not differ to a significant extent. For example, the presenter computer 12 is contemplated to include a user interface having a presenter display 40 as depicted in FIG. 3, one or more manual input devices 24b, a microphone (not shown), an audio output unit 24c to enable information to be audibly delivered to the presenter, and a voice synthesis and recognition unit 24d. It should also be noted that the audio output unit 24c and the voice synthesis and recognition unit 24d may actually share one or more required components. For example, an audio speaker and the associated interface circuitry (not shown) may be a common component shared by such modules when both are included. Further, skilled persons will note that the presenter and audience computers may be most preferably embodied by the ubiquitous personal computer or PC.

Referring to FIG. 3, it can be seen that the presenter display 40 may selectively be partitioned in viewing areas. In a most preferred embodiment of the presenter display 40, the viewing areas may include a first area 42 that contains information associated with the subject matter or topic being interactively presented, and a second area 44 to display information associated with specific audience computers 20. As such the presenter display 40 will enable information associated with the subject matter (i.e., the problem or discussion statement) being presented to be readily available to the presenter, and additionally enable the private viewing of information associated with the respective audience computers 20 (and the associated audience members thereat). For example, if audience members at respective audience computers 20 request or solicit additional information, or provide an answer to a problem statement, such information may be viewed and considered, simultaneously, by the presenter a single screen, without other audience members having access. Accordingly, in a most preferred embodiment of the presenter display 40, the second viewing area 44, may be partitioned into what may be termed "sub-areas" 44a, with each sub-area 44a displaying information associated with a particular respective audience computer 20. In a preferred embodiment of the present invention the presenter display 40 (of FIG. 3) would be arranged to be viewable by the presenter, and generally not viewable by the audience members.

Figure 4A:
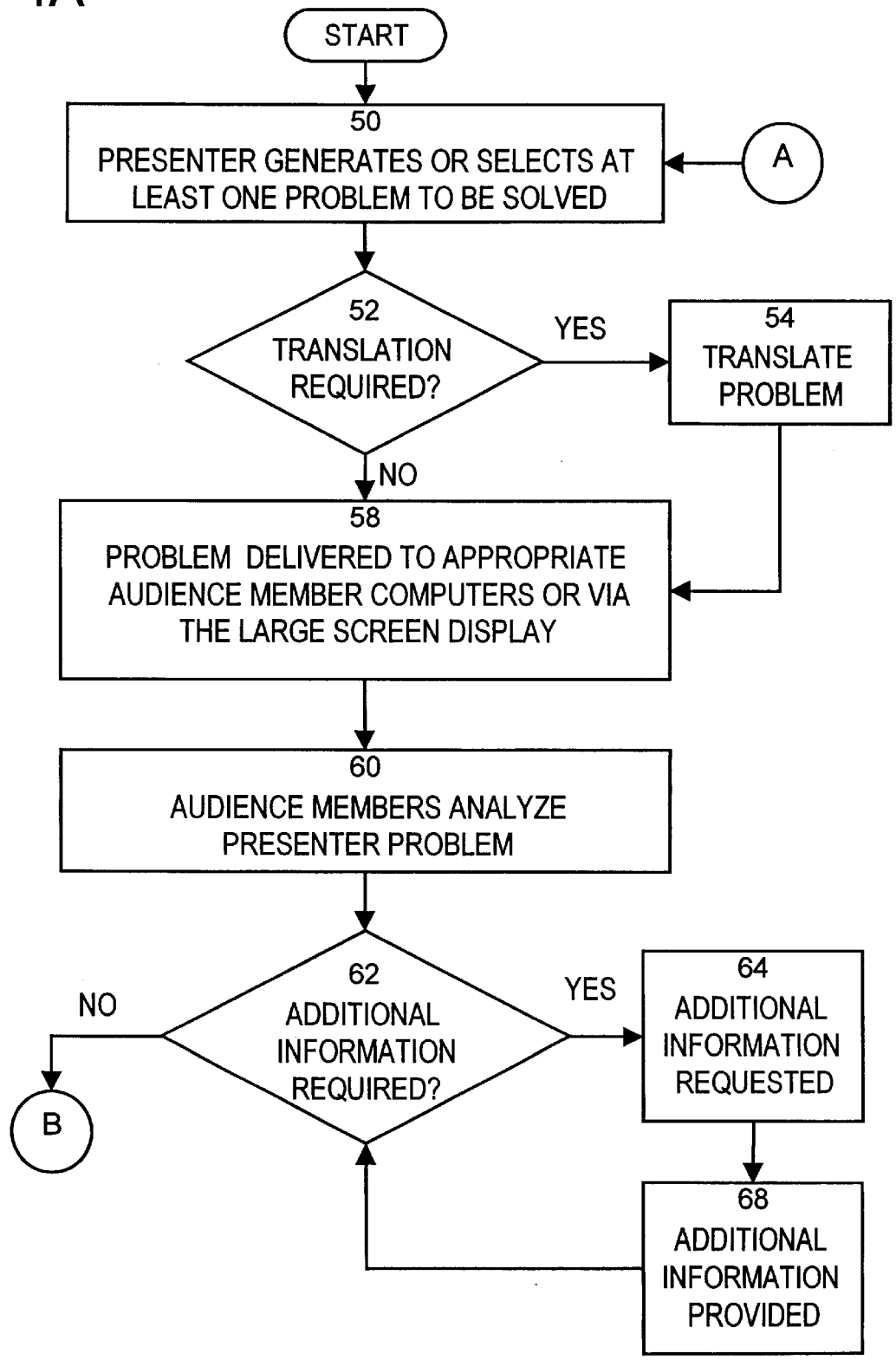
FIGS. 4A and 4B illustrate a high-level flow chart of an embodiment of a method for the presentation of a problem statement that may be interactively examined in a classroom type environment.
Figure 4B:
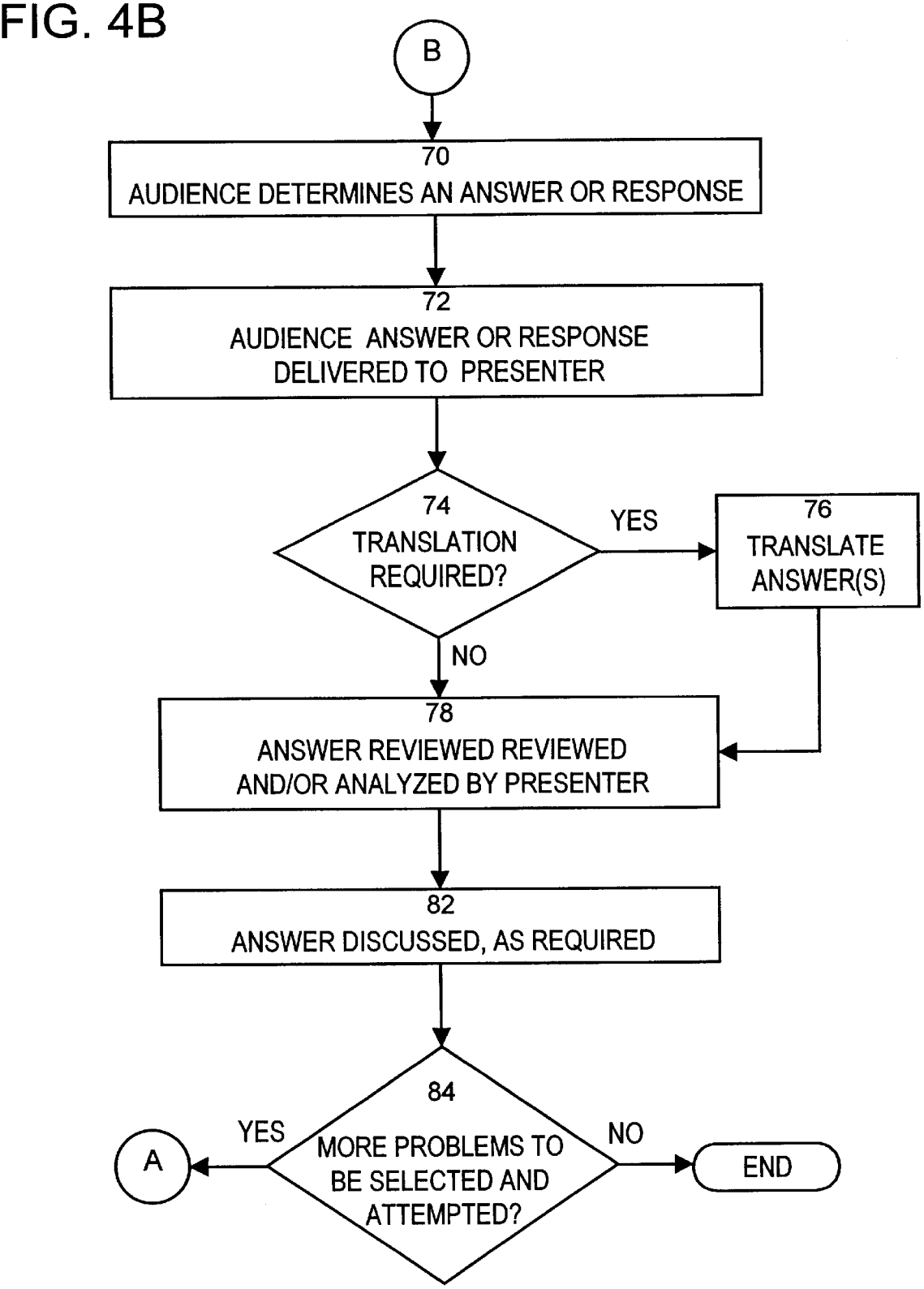

Referring now to FIGS. 4A and 4B there is provided therein a high-level flow chart of an embodiment of a method for the presentation of a problem statement that may be interactively considered, possibly in a classroom type environment. The method presents the subject matter information, which would generally include a problem statement, to audience members. As discussed above, the subject matter information would generally be presented by employing a presenter computer 12 operated by a presenter, and at least one audience computer 20 operated by one or more audience members. It may be assumed that the presenter computer 12 has associated therewith the large display unit 16 to receive information for displaying and viewing by essentially all the audience members. The method may begin at 50 with the generating of a problem statement by the presenter to be considered and solved. A plurality of problem statements would preferably be predefined and available for selection and delivery to the audience members. If determined necessary at 52, a translation of the problem statement may be conducted at 54. Such a translation activity may actually result in the problem statement being translated into one or more languages, based on the needs of the specific audience members. At 58 the problem statement is delivered to the respective audience members. The 'delivery' may be by way of at least one of a large display unit 16, or alternately by the display units 24a of the respective audience computers 20, or both. A respective audience computer 20 would be associated with and used by at least one or more audience members. As discussed above, the problem statement would be delivered to the audience computers 20 via a suitable communication network 48 that enables information to be exchanged between the presenter computer 12, the audience computers 20, and possibly the large display unit 16 (when not directly operatively coupled to the presenter computer). Once the problem statement is delivered at 60, a temporal period is provided for consideration and analysis of the problem statement (after delivery) by the audience members at the respective audience computers 20. If at 62 it is determined that additional information is needed, requests are generated at 64 and the additional information required is provided at 68. The astute observer will notice that translation may be required and conducted in the portion of the method established by 62, 64, and 68.

Once all audience members (or groups of audience members associated with respective audience computers) have been provided all requested additional information, and no further additional information is required, at 70 audience members determine answers or suitable solutions for the problem statement. At 72 the audience answers are delivered to the presenter. If translation is determined to be necessary at 74, the translation activities are conducted at 76. At 78 the answers are received at the presenter computer 12 (after the answers are sent/provided by the audience members via the audience computers 20), and preferably displayed for review and analysis by the presenter on the presenter display 40 included with the presenter computer 12. As discussed above, the presenter display 40 may be partitioned into a plurality of viewing areas or regions, with each associated with a respective audience computer 20. At 82, one or more of the answers received, or a known correct answer (not received) may be discussed. As skilled persons will appreciate, the correct or audience provided answers may be reviewed and discussed in a number of suitable ways. These include employing the large screen display units 16 and or the audience computer display units 24a. If at 84 it is determined that additional problem statements are to be presented, attempted, and discussed, the method may be repeated with activities beginning at again at 50.

Skilled persons will note that many variations to the method of FIGS. 4A and 4B are possible. Steps may be altered, rearranged, and or added. For example, it is implied that translation at 54 of the problem statement occurs at the presenter computer 12 and is then delivered to the 'appropriate audience member computers' at 58. It should be noted that such translation may alternately be conducted at a respective audience computer 20 after delivery. Indeed, if there is a requirement to provide translation to multiple languages, say as indicated by each respective group of audience members at each respective audience computer 20, it may be preferable to provide translations locally at the audience computers. Skilled persons may provide many additional alterations to embodiment of the operating method of FIGS. 4A and 4b.

It should also be noted that the inclusion of voice synthesis and recognition units within the audience computers 20 and the presenter computers 12 may be employed to deliver voice synthesized information to the audience members at the respective audience computers 20, and further enable voice synthesized information to be delivered to the presenter at the presenter computer 12. As is well known within the art, the skillful use of hardware and software is required to provide an accurate and useful embodiment of such a voice synthesis and recognition unit.

Figure 5A:
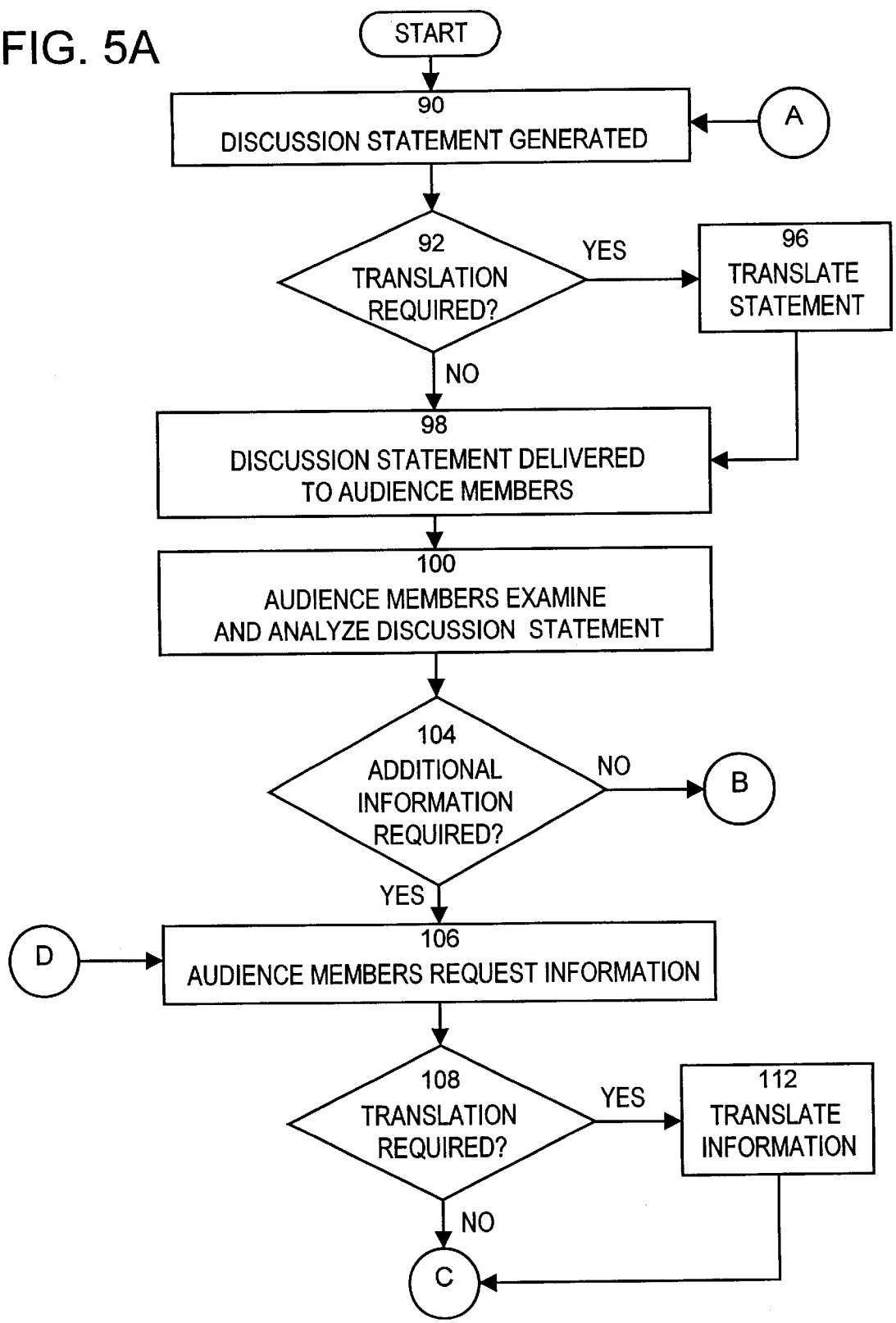
FIGS. 5A and 5B illustrate a high-level flow chart of an embodiment of a method usable for the interactive presentation of a topic or discussion statement to a plurality of audience members.
Figure 5B:
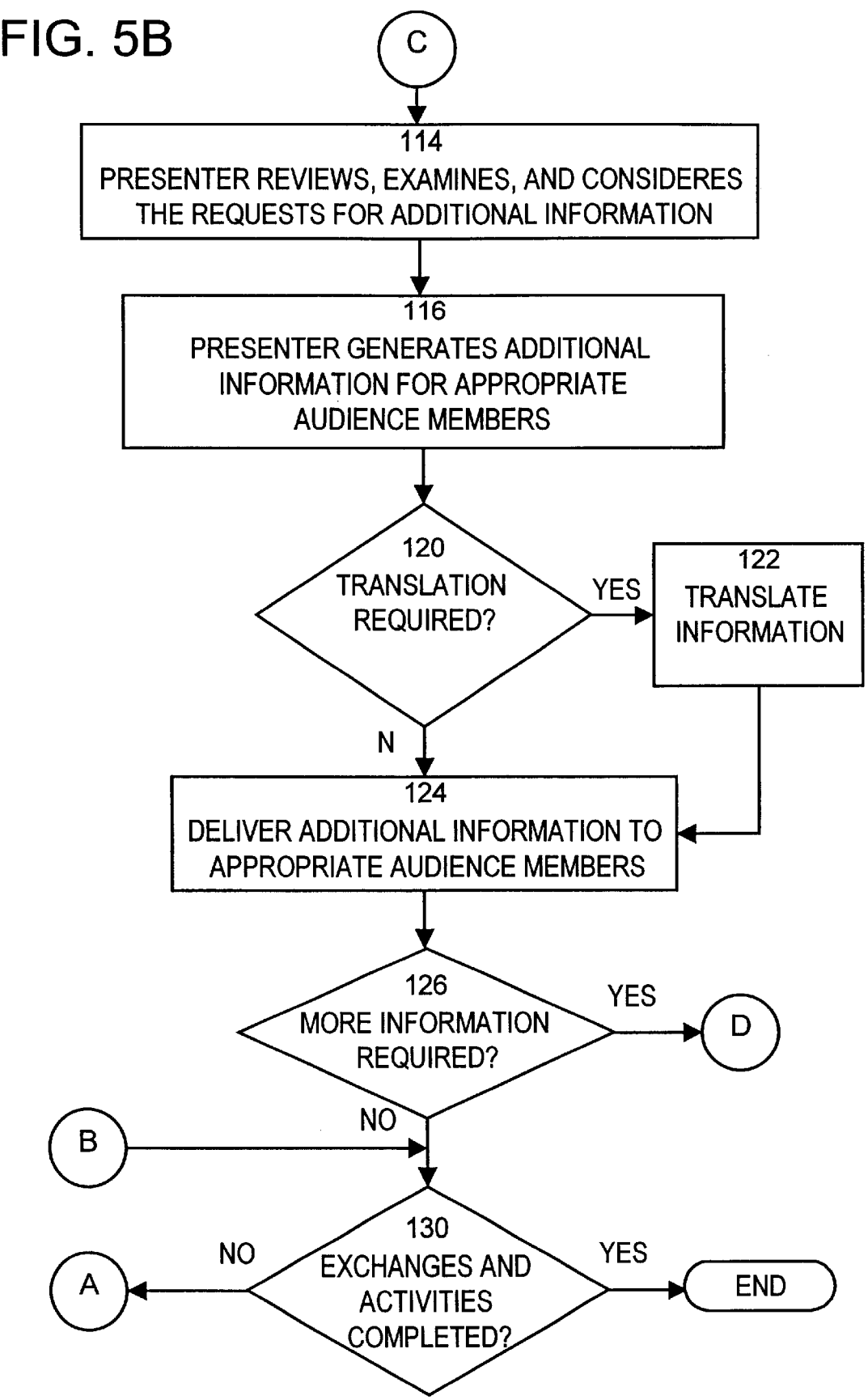

Turning now to FIGS. 5A and 5B, there is illustrated therein a high-level flow chart of an embodiment of a method usable for the interactive presentation of a discussion statement to be considered by a plurality of audience members. The method of FIGS. 5A and 5b may commence at 90 with the generating of a specific discussion statement by the presenter (which is to be considered by the audience members). As with the problem statements, a plurality of discussion statements may be available for selection and delivery to the audience members. If translation is determined to be required at 92, the discussion statement is translated, as required, at 96. At 98 the discussion statement is delivered to the audience members. As discussed above, the 'delivery' may be by way of at least one of the large display units 16, or the display units 24a of the respective audience computers 20, or both. A respective audience computer 20, which is contemplated to be utilized by at least one or more audience members, would receive the delivered discussion statement via the suitable communication network 48. Next at 100, a temporal interval may be provided for the audience members to analyze, and possibly permit a discussion amongst a group of audience members at a respective audience computer 20. At 104, if a determination is made that additional information is required, such information may be requested at 106. Should it be determined that translation is required at 108, translation is provided at 112. At 114, the presenter receives and analyzes one or more requests for additional information. At 116, suitable additional information is determined. If translation is determined to be required at 120, the translation activities are conducted at 122, with the information delivered to the appropriate audience members at 124. At 126, if audience members still need additional information, the loop comprised of 106 through 124 is repeated, as required. If at 126 (and 104 also), it is determined that no additional information is required for the present discussion statement, a determination is made at 130 as to whether all discussion statement exchanges and activities are complete. If no further discussion is required, or if an allocated temporal interval for all discussion actives has expired, the presentation and discussion is ended. Alternately, if additional discussions are to take place, as determined at 130, step 90 is again conducted, and the entire process is repeated.

It is important to understand that the description of the embodiments of the present invention are illustrative only, and other equivalent arrangements are certainly possible. Accordingly, it should be noted that as indicated above for the method embodied in FIGS. 4A and 4B, the presentation method of FIGS. 5A and 5B may also be altered, possibly significantly. For example, provisions for translation via 92, 96, 108, 112, 120, and 122, may be omitted, or as discussed the location of translation (i.e., at the presenter computer 12 or at the audience computer 20) may be varied. In addition, it may be desirable to have statements generated by audience members that are be considered by the entire audience and or by the presenter. Therefore, while there have been described herein currently preferred embodiments of the methods and means of the present invention, those skilled in the art will recognize that other and further modifications may be made without departing from the invention, and it is intended to claim all such modifications and variations as fall within the scope of the appended claims.

What is claimed is:

1. A method to interactively present subject matter information, including a problem statement, to audience members, the subject matter information presented by employing a presenter computer operated by a presenter and at least one audience computer operated by one or more audience members, the presenter computer having associated therewith a display unit to receive information from the presenter computer for displaying and viewing by the audience members, the method comprising the steps of:

a) generating a problem statement by the presenter to be solved;

b) delivering the problem statement to audience members via at least one of the display unit and respective audience computers being used by associated audience members, the problem statement delivered to the audience computers via a communication network that enables information to be exchanged between the presenter computer and the audience computers wherein the problem statement is translated from a language of the presenter to one or more languages of the audience members before being displayed on the display unit;

c) providing a temporal period for analysis of the problem statement after delivery to the audience members;

d) permitting additional information to be requested by audience members, wherein the requests for the additional information made by audience members are translated to the language of the presenter and then are provided to the presenter;

e) determining and delivering at least one appropriate response to the requests for additional information received by the presenter, when such requests are made;

f) repeating steps d) and e), as required, until audience members are able to attempt an answer to the problem statement;

g) receiving answers at the presenter computer as they are provided by the audience members via the audience computers, h) displaying the answers for review and analysis by the presenter, via a display included with the presenter computer;

i) discussing and reviewing, if deemed necessary by the presenter, at least one of the received answers from the audience member computers and a predetermined correct answer; and j) repeating steps a) through i), as required, until all problem statements to be presented to the audience members have been presented, analyzed and reviewed.

2. The method according to claim 1, wherein the requests for additional information are input at the respective audience computers and are translated, if required, from a language of the audience members thereat to a language of the presenter, the translation conducted at one of either the audience computer and the presenter computer.

3. The method according to claim 1, wherein the presenter computer includes a presenter display that is viewable by the presenter to display at least one of:

a) information associated with the problem statement being presented;

b) one or more requests for additional information requested by audience members by way of respective audience computers; and b) answers received from respective audience computers.

4. The method according to claim 3, wherein the presenter may select one or more pre-defined responses that may be provided to audience members by one or more of the following:

a) by the screen display;

b) by display units of the respective audience computers; and c) by way of a voice synthesis and recognition unit included with the audience computers, which may be employed to deliver a voice synthesized information to the audience members at the respective audience computers.

5. The method according to claim 1, wherein the presenter display is partitioned into regions that ar e associated with a plurality of the audience computers.

6. A method to interactively present subject matter to audience members, the subject matter, which includes discussion statements, is presented by employing a presenter computer operated by a presenter and a plurality of audience computers, each operated by one or more audience members, the presenter computer having associated therewith a display unit to receive information from the presenter computer for displaying and viewing by the audience members, the method comprising the steps of:

a) generating a discussion statement by the presenter to be considered by the audience members;

b) delivering the discussion statement to audience members via at least one of the display unit and respective display units of the audience computers being used by associated audience members, the discussion statement delivered to the audience computers via a communication network that enables information to be exchanged between the presenter computer and the audience computers wherein the discussion statement is translated to one or more languages appropriate for the audience members, and any requests for additional information are translated to a language appropriate for the presenter; and c) providing a temporal period for the analysis of the discussion statement, by audience members, after delivery;

d) permitting additional information to be requested by audience members, as needed;

e) providing, as required, information to the audience members, the information provided based on, and related to, requests received from the audience members;

f) repeating steps a) through e), until all requests for additional information have been satisfied and no additional requests are forthcoming from the audience members; and g) repeating steps a) through f) until all subject matter information to be presented to the audience members has been presented and discussed.

7. The method according to claim 6, wherein the requests the additional information from the audience members are made either vocally or by way of information sent to the presenter computer from the respective audience member computers.

8. The method according to claim 6, wherein the presenter display is partitioned into a plurality of viewing areas, with a specific area associated with respective audience computers.

* * * * *